United States Patent
Tsujimura et al.

(10) Patent No.: US 9,260,554 B2
(45) Date of Patent: Feb. 16, 2016

(54) COPOLYMER, MONOMER COMPOSITION, RESIN SOLUTION, AND RESIN FILM

(71) Applicant: SHOWA DENKO K.K., Tokyo (JP)

(72) Inventors: Yumi Tsujimura, Gunma (JP); Masayuki Kobayashi, Gunma (JP); Takao Ichikawa, Gunma (JP); Atsuo Endo, Gunma (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/413,570

(22) PCT Filed: Jul. 8, 2013

(86) PCT No.: PCT/JP2013/068678
§ 371 (c)(1),
(2) Date: Jan. 8, 2015

(87) PCT Pub. No.: WO2014/010565
PCT Pub. Date: Jan. 16, 2014

(65) Prior Publication Data
US 2015/0175729 A1    Jun. 25, 2015

(30) Foreign Application Priority Data
Jul. 12, 2012  (JP) .............................. 2012-156169

(51) Int. Cl.
| | |
|---|---|
| C08F 220/18 | (2006.01) |
| C09D 133/10 | (2006.01) |
| C09D 133/14 | (2006.01) |
| C08F 220/30 | (2006.01) |
| C08F 220/32 | (2006.01) |
| C09D 133/06 | (2006.01) |
| C09D 4/00 | (2006.01) |

(52) U.S. Cl.
CPC ............ *C08F 220/18* (2013.01); *C08F 220/30* (2013.01); *C08F 220/32* (2013.01); *C09D 133/06* (2013.01); *C09D 133/068* (2013.01); *C09D 133/10* (2013.01); *C09D 133/14* (2013.01); *C08F 2220/301* (2013.01); *C09D 4/00* (2013.01)

(58) Field of Classification Search
CPC .... C08F 220/18; C08F 220/30; C08F 220/32; C08F 2220/301; C09D 133/10; C09D 133/14
USPC ............. 524/548, 190, 509; 430/280.1, 281.1
See application file for complete search history.

(56) References Cited

U.S. PATENT DOCUMENTS

2012/0003586 A1* 1/2012 Fujii et al. ............. C08F 212/14
                                                    430/287.1

FOREIGN PATENT DOCUMENTS

| | | |
|---|---|---|
| CN | 1875041 | 12/2006 |
| JP | 2005-272773 | 10/2005 |
| JP | 2005272773 A * | 10/2005 |
| JP | 2005-314692 | 11/2005 |
| JP | 2007-33518 | 2/2007 |
| JP | 2010-250271 | 11/2010 |
| JP | 2011-162624 | 8/2011 |
| JP | 2011-190179 | 9/2011 |

OTHER PUBLICATIONS

International Search Report issued Sep. 17, 2013 in International (PCT) Application No. PCT/JP2013/068678.
Office Action issued Oct. 10, 2015 in corresponding Chinese Application No. 201380036691.4, with English translation.

* cited by examiner

*Primary Examiner* — Michael M Bernshteyn
(74) *Attorney, Agent, or Firm* — Wenderoth, Lind & Ponack, L.L.P.

(57) ABSTRACT

A copolymer of the present invention comprises a repeating unit derived from phenylphenyl (meth)acrylate; a repeating unit derived from a hydroxyphenyl group-containing unsaturated compound; and a repeating unit derived from an epoxy group-containing unsaturated compound. The copolymer of the present invention brings together excellent transparency and a high refractive index. A resin film formed from the copolymer of the present invention can be suitably utilized in the formation of a protective film or interlayer insulating film for an electronic part such as a liquid crystal display device, an integrated circuit device, or a solid-state imaging device, the formation of a microlens or a microlens array, the formation of an optical waveguide, or the like.

14 Claims, No Drawings

COPOLYMER, MONOMER COMPOSITION, RESIN SOLUTION, AND RESIN FILM

TECHNICAL FIELD

The present invention relates to a copolymer suitable for an application where excellent transparency and a high refractive index are required, specifically, formation of a protective film or interlayer insulating film for an electronic part such as a liquid crystal display device, an integrated circuit device, or a solid-state imaging device, formation of a microlens or a microlens array, formation of an optical waveguide, or the like.

BACKGROUND ART

As a method for obtaining a high-refractive index material, there has been known a method involving introducing a sulfur atom into an organic compound, a method involving forming a composite by combining inorganic particles each made of titanium oxide, zirconium oxide, or the like with an organic component (such as a polymer), or the like. However, the introduction of a large amount of the sulfur atoms may cause an odor problem or a reduction in stability due to a disulfide produced as a byproduct from an impurity in a raw material. Further, a composite of the inorganic particles and the organic component may cause a problem in association with the agglomeration of the particles (such as a reduction in transparency).

In addition, an attempt has been made to introduce an aromatic skeleton to obtain a high-refractive index material. In particular, a fluorene skeleton (9,9-bisphenolfluorene skeleton) out of the aromatic skeletons has characteristics such as a high refractive index and high heat resistance, and hence a high-refractive index material using a compound having such fluorene skeleton has been studied.

For example, Patent Document 1 discloses a photopolymerizable resin composition containing an epoxy resin having a fluorene skeleton (such as bisphenol fluorene diglycidyl ether or a 9,9-bis(glycidyloxy $C_{2-4}$ alkoxyphenyl)fluorene), an alkoxysilane, and a photoacid generator. In addition, Patent Document 2 discloses a high-refractive index material obtained by curing a polymerizable composition containing a fluorene compound, a metal alkoxide, and a photoacid generator.

However, any such high-refractive index material using a compound with a fluorene skeleton uses a photoacid generator, and hence concern has been raised about a reduction in transparency due to the remaining of the generator.

Further, a photosensitive resin composition has been used in: the formation of a protective film for preventing the deterioration of, or damage to, an electronic part such as a TFT-type liquid crystal display device, a magnetic head device, an integrated circuit device, or a solid-state imaging device; the formation of an interlayer insulating film for insulating a gap between wirings placed in a layer manner; the formation of a microlens or a microlens array; or the formation of an optical waveguide. The photosensitive resin composition is required to have excellent transparency and to have a high refractive index from the viewpoint of a concentration.

Patent Document 3 discloses a composition comprising: a copolymer containing hydroxyphenyl (meth)acrylate and an epoxy group-containing unsaturated compound as polymerizable components; and a quinone diazide group-containing compound, as such a photosensitive resin composition. However, the refractive index of the composition is low and its transparency is insufficient.

Patent Document 1: Japanese Patent Application laid-open No. 2005-314692
Patent Document 2: Japanese Patent Application laid-open No. 2011-190179
Patent Document 3: Japanese Patent Application laid-open No. 2007-033518

SUMMARY OF INVENTION

Technical Problem

Therefore, the present invention has been made in consideration of such circumstances as described above, and an object of the present invention is to provide a copolymer that brings together excellent transparency and a high refractive index.

Solution to the Problem

In view of the foregoing, the inventors of the present invention have made extensive studies in order to achieve the above-mentioned object, and as a result, have found that the object can be achieved by a copolymer, including: a repeating unit derived from phenylphenyl (meth)acrylate; a repeating unit derived from a hydroxyphenyl group-containing unsaturated compound; and a repeating unit derived from an epoxy group-containing unsaturated compound. Thus, the inventors have completed the present invention.

That is, the present invention provides the following items [1] to [13].

[1] A copolymer, comprising:
 a repeating unit derived from phenylphenyl(meth)acrylate;
 a repeating unit derived from a hydroxyphenyl group-containing unsaturated compound; and
 a repeating unit derived from an epoxy group-containing unsaturated compound.

[2] A copolymer according to item [1], comprising 5 mol % to 70 mol % of the repeating unit derived from the phenylphenyl (meth)acrylate, 5 mol % to 80 mol % of the repeating unit derived from the hydroxyphenyl group-containing unsaturated compound, and 5 mol % to 60 mol % of the repeating unit derived from the epoxy group-containing unsaturated compound.

[3] A copolymer according to item [1] or [2], wherein the hydroxyphenyl group-containing unsaturated compound is hydroxyphenyl (meth)acrylate.

[4] A copolymer according to any one of items [1] to [3], wherein the epoxy group-containing unsaturated compound is an epoxy group-containing (meth)acrylate.

[5] A copolymer according to item [4], wherein the epoxy group-containing (meth)acrylate is selected from the group consisting of glycidyl methacrylate and 3,4-epoxycyclohexylmethyl methacrylate.

[6] A monomer composition, comprising:
 1 mass % to 45 mass % of phenylphenyl (meth)acrylate;
 1 mass % to 43 mass % of a hydroxyphenyl group-containing unsaturated compound;
 1 mass % to 40 mass % of an epoxy group-containing unsaturated compound;
 45 mass % to 90 mass % of a reaction solvent; and
 0.2 mass % to 20 mass % of a polymerization initiator.

[7] A monomer composition according to item [6], wherein the hydroxyphenyl group-containing unsaturated compound is hydroxyphenyl (meth)acrylate.

[8] A monomer composition according to item [6] or [7], wherein the epoxy group-containing unsaturated compound is an epoxy group-containing (meth)acrylate.

[9] A monomer composition according to item [8], wherein the epoxy group-containing (meth)acrylate is selected from the group consisting of glycidyl methacrylate and 3,4-epoxycyclohexylmethyl methacrylate.

[10] A copolymer, which is obtained by polymerizing the monomer composition according to any one of items [6] to [9].

[11] A resin solution, comprising the copolymer according to any one of items [1] to [5] and [10].

[12] A resin solution, which is obtained by:
reacting the monomer composition according to any one of items [6] to [9] at 70 to 100° C. for 5 to 10 hours; and
adjusting a solid content to 20 to 50 mass %.

[13] A resin film, which is obtained by:
applying the resin solution according to item [11] or [12] onto a substrate; and
drying the resin solution.

Advantageous Effects of the Invention

According to the present invention, a copolymer that brings together excellent transparency and a high refractive index can be provided. A resin film formed from the copolymer can be suitably utilized in the format ion of a protective film or interlayer insulating film for an electronic part such as a liquid crystal display device, an integrated circuit device, or a solid-state imaging device, the formation of a microlens or a microlens array, the formation of an optical waveguide, or the like.

DESCRIPTION OF EMBODIMENTS

Hereinafter, a copolymer of the present invention is described in detail.

It should be noted that the term "(meth)acrylate" as used in the description and scope of claims of the present application means a methacrylate or an acrylate.

The copolymer of the present invention is a copolymer containing a repeating unit derived from phenylphenyl(meth)acrylate (also referred to as "biphenyl(meth)acrylate"), a repeating unit derived from a hydroxyphenyl group-containing unsaturated compound, and a repeating unit derived from an epoxy group-containing unsaturated compound, which is obtained by polymerizing the phenylphenyl(meth)acrylate, the hydroxyphenyl group-containing unsaturated compound, and the epoxy group-containing unsaturated compound. In the copolymer, the content of the repeating unit derived from phenylphenyl(meth)acrylate is preferably from 5 mol % to 70 mol %, the content of the repeating unit derived from the hydroxyphenyl group-containing unsaturated compound is preferably from 5 mol % to 80 mol %, and the content of the repeating unit derived from the epoxy group-containing unsaturated compound is preferably from 5 mol % to 60 mol %. When the content of the repeating unit derived from phenylphenyl(meth)acrylate is less than 5 mol %, an improvement on the refractive index may not be obtained. On the other hand, when the content exceeds 70 mol %, the solvent solubility of the copolymer obtained reduces, and hence turbidity occurs or it becomes difficult to handle the copolymer in some cases. When the content of the repeating unit derived from the hydroxyphenyl group-containing unsaturated compound is less than 5 mol %, a curing reaction with an epoxy group may become insufficient. On the other hand, when the content exceeds 80 mol %, the transparency tends to reduce. When the content of the repeating unit derived from the epoxy group-containing unsaturated compound is less than 5 mol %, a curing reaction with a hydroxyl group may become insufficient. On the other hand, when the content exceeds 60 mol %, the refractive index tends to reduce. The copolymer of the present invention more preferably contains 10 mol % to 65 mol % of the repeating unit derived from phenylphenyl(meth)acrylate, 10 mol % to 70 mol % of the repeating unit derived from the hydroxyphenyl group-containing unsaturated compound, and 10 mol % to 50 mol % of the repeating unit derived from the epoxy group-containing unsaturated compound. In particular, when the copolymer is used as a photosensitive resin, the content of the repeating unit derived from the hydroxyphenyl group-containing unsaturated compound is preferably from 50 mol % to 70 mol % from the viewpoint of imparting good alkali solubility to a resin film.

Specific examples of the phenylphenyl (meth)acrylate in the present invention include o-phenylphenyl acrylate, m-phenylphenyl acrylate, p-phenylphenyl acrylate, o-phenylphenyl methacrylate, m-phenylphenyl methacrylate, and p-phenylphenyl methacrylate. These (meth)acrylates may either be used alone, or two or more kinds thereof may be used in combination. Of those, p-phenylphenyl (meth)acrylate is preferred because p-phenylphenyl (meth)acrylate causes small steric hindrance during the polymerization reaction.

The hydroxyphenyl group-containing unsaturated compound in the present invention is a compound having a hydroxyphenyl group and an ethylenic double bond. Specific examples thereof include: a hydroxyphenyl (meth)acrylate such as o-hydroxyphenyl acrylate, m-hydroxyphenyl acrylate, p-hydroxyphenyl acrylate, o-hydroxyphenyl methacrylate, m-hydroxyphenyl methacrylate, and p-hydroxyphenyl methacrylate; hydroxystyrene; isopropenylphenol; hydroxyphenyl(meth)acrylamide; and vinyl hydroxyphenyl ether. These compounds may either be used alone, or two or more kinds thereof may be used in combination. Of those, p-hydroxyphenyl acrylate and p-hydroxyphenyl methacrylate are preferred in terms of a light transmittance and heat resistance when a resin film is prepared.

The epoxy group-containing unsaturated compound in the present invent ion is a compound having an epoxy group and an ethylenic double bond. Specific examples thereof include: an aliphatic epoxy group-containing unsaturated compound such as glycidyl acrylate, glycidyl methacrylate, glycidyl α-ethylacrylate, 3,4-epoxybutyl acrylate, 3,4-epoxybutyl methacrylate, 3,4-epoxybutyl α-ethylacrylate, 6,7-epoxyheptyl acrylate, 6,7-epoxyheptyl methacrylate, 6,7-epoxyheptyl α-ethylacrylate, vinyl glycidyl ether, allyl glycidyl ether, isopropenyl glycidyl ether, o-vinylbenzyl glycidyl ether, m-vinylbenzyl glycidyl ether, or p-vinylbenzyl glycidyl ether; and an alicyclic epoxy group-containing unsaturated compound such as vinylcyclohexene monooxide, 3,4-epoxycyclohexylmethyl acrylate, or 3,4-epoxycyclohexylmethyl methacrylate. These compounds may either be used alone, or two or more kinds thereof may be used in combination. Of those, an epoxy group-containing (meth)acrylate is preferred, and an epoxy group-containing (meth)acrylate selected from glycidyl methacrylate and 3,4-epoxycyclohexylmethyl methacrylate is more preferred in terms of polymerization reactivity, and a light transmittance and heat resistance when a resin film is prepared.

In addition, any other polymerizable monomer may be used in combination to the extent that the effect of the present invention is not impaired. Examples of such polymerizable monomer include styrene, benzyl (meth)acrylate, vinyltoluene, and vinylbenzoic acid.

The weight-average molecular weight (Mw) of the copolymer of the present invention is preferably from 5,000 to 60,000, or more preferably from 8,000 to 50,000 calculated in terms of polystyrene. When the weight-average molecular weight is less than 5,000, the resin film may become brittle.

On the other hand, when the weight-average molecular weight exceeds 60,000, the resin may not dissolve in a solvent.

It should be noted that a value for the molecular weight of the copolymer in the present invention is calculated from a value, which is measured by means of gel permeation chromatography (GPC) under the following conditions, in terms of polystyrene. The weight-average molecular weight and molecular weight distribution of the copolymer are calculated while a time period from the rise time of GPC to a time point 15 minutes thereafter is defined as a calculation range.
Column: Shodex (trademark) LF-804+LF-804
Column temperature: 40° C.
Developing solvent: tetrahydrofuran
Detector: differential refractive index detector (Shodex (trademark) RI-101)
Flow rate: 1 mL/min The polymerization react ion for obtaining the copolymer of the present invention is not particularly limited and a typical radical polymerization method that has heretofore been performed can be applied. Specifically, the copolymer is obtained by: dissolving phenylphenyl (meth)acrylate, the hydroxyphenyl group-containing unsaturated compound, and the epoxy group-containing unsaturated compound at desired ratios in a reaction solvent; mixing a polymerization initiator in the solution; and polymerizing the mixture at about 70 to 100° C. for about 5 to 10 hours.

Phenylphenyl (meth)acrylate, the hydroxyphenyl group-containing unsaturated compound, the epoxy group-containing unsaturated compound, and the polymerization initiator alone may be subjected to bulk polymerization without the use of the reaction solvent.

Specific examples of the reaction solvent include methanol, ethanol, 1-propanol, isopropyl alcohol, butanol, ethylene glycol, acetone, methyl ethyl ketone, methyl isobutyl ketone, tetrahydrofutan, dioxane, toluene, xylene, ethyl acetate, isopropyl acetate, n-propyl acetate, butyl acetate, ethyleneglycol monomethyl ether acetate, propylene glycol monomethyl ether acetate, ethylene glycol monoethyl ether acetate, 3-methoxybutyl acetate, ethylene glycol monobutyl ether acetate, diethylene glycol monoethyl ether acetate, diethylene glycol monobutyl ether acetate, propylene glycol monomethyl ether, ethylene glycol monoethyl ether, 3-methoxybutanol, diethylene glycol monoethyl ether, diethylene glycol monobutyl ether, dimethyl sulfoxide, dimethylformamide, dimethylacetamide, and ethyl lactate. These solvents may either be used alone, or two or more kinds thereof may be used in combination.

Specific examples of the polymerization initiator include: an azo-based initiator such as 2,2'-azobis(2,4-dimethylvaleronitrile), 2,2'-azobis(2-butyronitrile), 2,2'-azobisisobutyronitrile, dimethyl-2,2'-azobisisobutyrate, or 1,1'-azobis(cyclohexane-1-carbonitrile); and an organic peroxide such a: benzoyl peroxide, lauryl peroxide, octanoyl peroxide, acetyl peroxide, di-t-butyl peroxide, t-butyl cumyl peroxide, dicumyl peroxide, t-butyl peroxyacetate, or t-butyl peroxybenzoate.

In addition, when a monomer composition of the present invention contains a reaction solvent, the monomer composition contains: 1 mass % to 45 mass % of phenylphenyl (meth)acrylate; 1 mass % to 43 mass % of a hydroxyphenyl group-containing unsaturated compound; 1 mass % to 40 mass % of an epoxy group-containing unsaturated compound; 45 mass % to 90 mass % of the reaction solvent; and 0.2 mass % to 20 mass % of a polymerization initiator. The ratios of phenylphenyl (meth)acrylate, the hydroxyphenyl group-containing unsaturated compound, and the epoxy group-containing unsaturated compound preferably correspond to the ratios of the repeating units in the copolymer of the present invention, and when the sum of these compounds is set to 100 parts by mass, the amount of the reaction solvent is from 500 to 700 parts by mass and the amount of the polymerization initiator is from 5 to 15 parts by mass. The monomer composition may contain the above-mentioned other polymerizable monomer.

The monomer composition of the present invention can be used as a raw material for the above-mentioned copolymer. A copolymer obtained by polymerizing the monomer composition brings together excellent transparency and a high refractive index. A resin film formed from the copolymer can be suitably utilized in the formation of a protective film or interlayer insulating film for an electronic part such as a liquid crystal display device, an integrated circuit device, or a solid-state imaging device, the formation of a microlens or a microlens array, the formation of an optical waveguide, or the like.

The resin film can be obtained by a method to be typically employed such as a method involving applying and drying a resin solution containing the copolymer of the present invent ion. A resin solution of the present invention can be obtained by, for example, reacting the monomer composition of the present invention at 70 to 100° C. for 5 to 10 hours, and adjusting a solid content to from 20 to 50 mass % through distillation or the like. The solid content of the resin solution is preferably from 25 to 45 mass %.

EXAMPLES

The present invention is hereinafter described specifically by way of Examples and Comparative Example. However, the present invention is by no means limited to these Examples.

Example 1

69 parts by mass of phenylphenyl methacrylate, 17 parts by mass of p-hydroxyphenyl methacrylate, 14 parts by mass of glycidyl methacrylate, 600 parts by mass of propylene glycol monomethyl ether acetate, and 10 parts by mass of dimethyl 2,2'-azobis(2-methylpropionate) were loaded into a flask provided with a reflux condenser and a stirring machine, and the air in the flask was replaced with nitrogen. After that, the temperature of the mixed liquid was increased to 80° C. while the mixed liquid was stirred. The mixed liquid was subjected to a reaction at 80° C. for 6 hours. The disappearance of the monomers was confirmed by gel permeation chromatography and the temperature of the resultant was increased to 100° C., followed by aging for 30 minutes. Propylene glycol monomethyl ether acetate was removed by distillation at 100° C. under reduced pressure, and the solid content of the residue was adjusted to 30 mass %. Thus, a resin solution was obtained.

A copolymer in the resin solution had a weight-average molecular weight (Mw) of 8,800 and a molecular weight distribution (Mw/Mn) of 3.6.

Example 2

38 parts by mass of phenylphenyl methacrylate, 47 parts by mass of p-hydroxyphenyl methacrylate, 15 parts by mass of glycidyl methacrylate, 600 parts by mass of propylene glycol monomethyl ether acetate, and 10 parts by mass of dimethyl 2,2'-azobis(2-methylpropionate) were loaded into a flask provided with a ref lux condenser and a stirring machine, and the mixed liquid was subjected to a reaction in the same manner as in Example 1. Thus, a resin solution was obtained.

A copolymer in the resin solution had a weight-average molecular weight (Mw) of 8,400 and a molecular weight distribution (Mw/Mn) of 3.5.

Example 3

13 parts by mass of phenylphenyl methacrylate, 70 parts by mass of p-hydroxyphenyl methacrylate, 16 parts by mass of glycidyl methacrylate, 600 parts by mass of propylene glycol monomethyl ether acetate, and 10 parts by mass of dimethyl 2,2'-azobis(2-methylpropionate) were loaded into a flask provided with a reflux condenser and a stirring machine, and the mixed liquid was subjected to a reaction in the same manner as in Example 1. Thus, a resin solution was obtained.

A copolymer in the resin solution had a weight-average molecular weight (Mw) of 8,000 and a molecular weight distribution (Mw/Mn) of 3.2.

Comparative Example 1

56 parts by mass of p-hydroxyphenyl methacrylate, 44 parts by mass of glycidyl methacrylate, 600 parts by mass of propylene glycol monomethyl ether acetate, and 8 parts by mass of dimethyl 2,2'-azobis(2-methylpropionate) were loaded into a flask provided with a reflux condenser and a stirring machine, and the mixed liquid was subjected to a reaction in the same manner as in Example 1. Thus, a resin solution was obtained.

A copolymer in the resin solution had a weight-average molecular weight (Mw) of 8,800 and a molecular weight distribution (Mw/Mn) of 2.8.

(1) Measurement of Transmittance

Each of the resin solutions obtained in Examples 1 to 3 and Comparative Example 1 was applied onto a glass so that its thickness became 3 μm, and the applied solution was dried in an oven at 80° C. for 30 minutes. After that, the resultant was heated at 250° C. for 3 hours. The transmittance of the resultant glass with a resin film at a wavelength of 400 nm was measured with a spectrophotometer. The result is shown in Table 1.

(2) Measurement of Refractive Index

Each of the resin solutions obtained in Examples 1 to 3 and Comparative Example 1 was applied onto a silicon, wafer so that its thickness became 1 μm, and the applied solution was dried in an oven at 80° C. for 30 minutes. The refractive index of the resultant silicon wafer with a resin film at a wavelength of 589 nm was measured with a table-top ellipsometer FE-5000S. The result is shown in Table 1.

TABLE 1

|  |  | Example 1 | Example 2 | Example 3 | Comparative Example 1 |
|---|---|---|---|---|---|
| Monomer content (mol %) | phenylphenyl methacrylate | 60 | 30 | 10 | 0 |
|  | p-hydroxyphenyl methacrylate | 20 | 50 | 70 | 50 |
|  | glycidyl methacrylate | 20 | 20 | 20 | 50 |
| Evaluation result | Transmittance (%) | 94 | 94 | 92 | 80 |
|  | Refractive index | 1.59 | 1.58 | 1.57 | 1.54 |

It should be noted that when each of the resin solutions obtained in Examples 2 and 3 was applied onto a silicon wafer so that its thickness became 1 μm, the applied solution was dried in an oven at 80° C. for 30 minutes, and then the resultant was evaluated for its alkali solubility by being immersed in a 2.38 wt % aqueous solution of tetramethylammonium hydroxide for 90 seconds, the resin film of Example 3 completely dissolved but the resin film of Example 2 was observed to remain undissolved to some extent.

It was understood from the foregoing that a resin film formed from each of the copolymers obtained in Examples 1 to 3 brought together excellent transparency and a high refractive index. In contrast, it was understood that a resin film formed from the copolymer obtained in Comparative Example 1 had a low refractive index and was poor in transparency. It was also understood that a resin film containing a large amount of a repeating unit derived from p-hydroxyphenyl methacrylate had good alkali solubility. A copolymer having good alkali solubility as described above can be suitably utilized as a resin component for a photosensitive resin composition.

The invention claimed is:

1. A copolymer, comprising:
   a repeating unit derived from phenylphenyl (meth)acrylate;
   a repeating unit derived from a hydroxyphenyl group-containing unsaturated compound; and
   a repeating unit derived from an epoxy group-containing unsaturated compound.

2. A copolymer according to claim 1, wherein the copolymer comprises 5 mol % to 70 mol % of the repeating unit derived from the phenylphenyl (meth)acrylate, 5 mol % to 80 mol % of the repeating unit derived from the hydroxyphenyl group-containing unsaturated compound, and 5 mol % to 60 mol % of the repeating unit derived from the epoxy group-containing unsaturated compound.

3. A copolymer according to claim 1, wherein the hydroxyphenyl group-containing unsaturated compound is hydroxyphenyl (meth)acrylate.

4. A copolymer according to claim 1, wherein the epoxy group-containing unsaturated compound is an epoxy group-containing (meth)acrylate.

5. A copolymer according to claim 4, wherein the epoxy group-containing (meth)acrylate is selected from the group consisting of glycidyl methacrylate and 3,4-epoxycyclohexylmethyl methacrylate.

6. A monomer composition, comprising:
   1 mass % to 45 mass % of phenylphenyl (meth)acrylate;
   1 mass % to 43 mass % of a hydroxyphenyl group-containing unsaturated compound;
   1 mass % to 40 mass % of an epoxy group-containing unsaturated compound;
   45 mass % to 90 mass % of a reaction solvent; and
   0.2 mass % to 20 mass % of a polymerization initiator.

7. A monomer composition according to claim 6, wherein the hydroxyphenyl group-containing unsaturated compound is hydroxyphenyl (meth)acrylate.

8. A monomer composition according to claim 6, wherein the epoxy group-containing unsaturated compound is an epoxy group-containing (meth)acrylate.

9. A monomer composition according to claim 8, wherein the epoxy group-containing (meth)acrylate is selected from the group consisting of glycidyl methacrylate and 3,4-epoxycyclohexylmethyl methacrylate.

10. A copolymer, which is obtained by polymerizing the monomer composition according to claim 6.

11. A resin solution, comprising the copolymer according to claim 1.

12. A resin solution, which is obtained by:
polymerizing the monomer composition according to claim 6 at 70 to 100° C. for 5 to 10 hours; and
adjusting a solid content to 20 to 50 mass %.

13. A resin film, which is obtained by:
applying the resin solution according to claim 11 onto a substrate; and
drying the resin solution.

14. A resin solution, comprising the copolymer according to claim 10.

* * * * *